(12) United States Patent
Scholten et al.

(10) Patent No.: US 10,681,132 B2
(45) Date of Patent: Jun. 9, 2020

(54) PROTOCOL FOR COMMUNICATING ENGINE DATA TO WIRELESS COMMUNICATION UNIT

(71) Applicant: GE Aviation Systems LLC, Grand Rapids, MI (US)

(72) Inventors: Michael Clay Scholten, Grand Rapids, MI (US); Richard John Reiffer, Jr., Middleville, MI (US); Matthew William Wiseman, Fairfield, OH (US); Kevin Michael James Furlong-Petsch, Kentwood, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 293 days.

(21) Appl. No.: 15/635,731

(22) Filed: Jun. 28, 2017

(65) Prior Publication Data

US 2018/0007136 A1    Jan. 4, 2018

Related U.S. Application Data

(60) Provisional application No. 62/356,703, filed on Jun. 30, 2016.

(51) Int. Cl.
*H01L 29/08* (2006.01)
*G06F 3/06* (2006.01)
(Continued)

(52) U.S. Cl.
CPC .......... *H04L 67/1097* (2013.01); *G06F 3/065* (2013.01); *G06F 3/067* (2013.01); *G06F 3/0619* (2013.01); *H04W 88/02* (2013.01)

(58) Field of Classification Search
CPC ..... H04L 67/1097; G06F 3/067; G06F 3/065; G06F 3/0619; H04W 88/02
(Continued)

(56) References Cited

U.S. PATENT DOCUMENTS 5,444,861 A    8/1995  Adamec et al.
5,848,367 A   12/1998  Lotocky et al.
(Continued)

FOREIGN PATENT DOCUMENTS

CN    204495911 U    7/2015
EP      2579473 B1    8/2016
JP      2957370 B2   10/1999

*Primary Examiner* — Marthe Y Marc-Coleman
(74) *Attorney, Agent, or Firm* — Dority & Manning, P.A.

(57) ABSTRACT

Systems and methods for recording and communicating engine data are provided. One example embodiment is directed to a method for communicating engine data to a ground system. The method includes receiving a request to store first data in a first memory location in one or more memory devices. The method includes receiving the first data, wherein the first data is associated with identification of an engine, and wherein the first data includes parameterized data. The method includes storing the first data in the first memory location. The method includes receiving a request to store second data in a second memory location in the one or more memory devices, wherein the second memory location is reserved for data to be transmitted to the ground system. The method includes receiving the second data. The method includes storing the second data in the second memory location.

20 Claims, 5 Drawing Sheets

(51) Int. Cl.
*H04W 4/44* (2018.01)
*H04L 29/08* (2006.01)
*H04W 88/02* (2009.01)

(58) Field of Classification Search
USPC .......................... 701/14, 34.4, 99; 455/431
See application file for complete search history.

(56) References Cited

U.S. PATENT DOCUMENTS

| | | | |
|---|---|---|---|
| 6,092,008 A | 7/2000 | Bateman | |
| 6,351,603 B2 | 2/2002 | Waithe et al. | |
| 6,353,734 B1 | 3/2002 | Wright et al. | |
| 6,385,513 B1 | 5/2002 | Murray et al. | |
| 6,628,995 B1 | 9/2003 | Korson et al. | |
| 6,671,589 B2 | 12/2003 | Holst et al. | |
| 6,831,912 B1 | 12/2004 | Sherman | |
| 6,868,325 B2 | 3/2005 | Menon et al. | |
| 6,894,611 B2 | 5/2005 | Butz et al. | |
| 7,218,277 B1 | 5/2007 | Smith | |
| 7,595,730 B2 | 9/2009 | Ziarno | |
| 7,636,568 B2 | 12/2009 | Gould et al. | |
| 7,720,442 B2 | 5/2010 | McGuffin | |
| 7,755,512 B2 | 7/2010 | Ziarno | |
| 7,844,385 B2 | 11/2010 | Loda et al. | |
| 7,908,042 B2 | 3/2011 | Brinkley et al. | |
| 8,051,031 B2 | 11/2011 | Sims, III et al. | |
| 8,055,393 B2 | 11/2011 | Sims, III et al. | |
| 8,121,140 B2 | 2/2012 | McGuffin et al. | |
| 8,140,298 B2 | 3/2012 | Bordry | |
| 8,220,038 B1 | 7/2012 | Lucchesi et al. | |
| 8,259,002 B2 | 9/2012 | Vacanti et al. | |
| 8,284,674 B2 | 10/2012 | True et al. | |
| 8,285,865 B2 | 10/2012 | Gruyer et al. | |
| 8,351,927 B2 | 1/2013 | Wright et al. | |
| 8,401,021 B2 | 3/2013 | Buga et al. | |
| 8,457,034 B2 | 6/2013 | Kuehl et al. | |
| 8,462,793 B2 | 6/2013 | Turcot | |
| 8,615,384 B2 | 12/2013 | Angus et al. | |
| 8,639,401 B2 | 1/2014 | Bailey et al. | |
| 8,683,266 B2 | 3/2014 | Migliasso et al. | |
| 8,699,403 B2 | 4/2014 | Lynch et al. | |
| 8,723,692 B2 | 5/2014 | Farley et al. | |
| 8,732,812 B2 | 5/2014 | Chopart | |
| 8,781,982 B1 | 7/2014 | Das et al. | |
| 8,798,817 B2 | 8/2014 | O'Dell et al. | |
| 8,823,357 B2 | 9/2014 | Shafer et al. | |
| 8,856,277 B2 | 10/2014 | Saugnac | |
| 8,881,294 B2 | 11/2014 | Johnson et al. | |
| 8,903,601 B2 | 12/2014 | Muirhead | |
| 8,984,346 B2 | 3/2015 | Frayssignes et al. | |
| 8,988,249 B2 | 3/2015 | Chevrette et al. | |
| 8,997,197 B2 | 3/2015 | Nord et al. | |
| 9,026,273 B2 | 5/2015 | Ziarno | |
| 9,026,279 B2 | 5/2015 | Ziarno | |
| 9,038,047 B2 | 5/2015 | Young et al. | |
| 9,092,629 B2 | 7/2015 | Guzman et al. | |
| 9,100,361 B1 | 8/2015 | Lucchesi et al. | |
| 9,124,580 B1 | 9/2015 | Sampigethaya | |
| 9,208,308 B2 | 12/2015 | McLain et al. | |
| 9,225,765 B2 | 12/2015 | Kimberly et al. | |
| 9,313,276 B2 | 4/2016 | Pereira | |
| 9,367,970 B2 | 6/2016 | Ziarno | |
| 9,369,548 B2 | 6/2016 | Voigt et al. | |
| 9,390,381 B2 | 7/2016 | Davari et al. | |
| 9,418,493 B1 | 8/2016 | Dong | |
| 9,420,595 B2 | 8/2016 | Beacham, Jr. et al. | |
| 9,426,650 B2 | 8/2016 | Bangole et al. | |
| 9,481,473 B2 | 11/2016 | Skertic | |
| 9,490,876 B2 | 11/2016 | Choi | |
| 9,576,404 B2 | 2/2017 | Ziarno et al. | |
| 9,639,997 B2 | 5/2017 | Chai et al. | |
| 2003/0158963 A1 | 8/2003 | Sturdy et al. | |
| 2003/0225492 A1 | 12/2003 | Cope et al. | |
| 2007/0139169 A1* | 6/2007 | Mitchell | H04B 7/18506 340/425.5 |
| 2008/0272915 A1 | 11/2008 | Day | |
| 2009/0058682 A1 | 3/2009 | True | |
| 2011/0125348 A1 | 5/2011 | Sandell et al. | |
| 2012/0095662 A1 | 4/2012 | Roy et al. | |
| 2014/0013002 A1 | 1/2014 | Holstein et al. | |
| 2014/0068265 A1 | 3/2014 | Irwin | |
| 2015/0161618 A1 | 6/2015 | Angus et al. | |
| 2015/0222604 A1 | 8/2015 | Ylonen | |
| 2015/0244683 A1 | 8/2015 | Schreiber | |
| 2015/0276837 A1 | 10/2015 | Kim et al. | |
| 2015/0293765 A1 | 10/2015 | Angus et al. | |
| 2015/0330869 A1 | 11/2015 | Ziarno | |
| 2015/0363981 A1* | 12/2015 | Ziarno | H04B 1/3822 701/101 |
| 2016/0075443 A1 | 3/2016 | Schmutz et al. | |
| 2016/0092192 A1 | 3/2016 | Frayssignes et al. | |
| 2016/0098259 A1 | 4/2016 | Mitchell | |
| 2016/0110179 A1 | 4/2016 | Weckesser et al. | |
| 2016/0124738 A1 | 5/2016 | Haukom et al. | |
| 2016/0154391 A1 | 6/2016 | Pavaskar et al. | |
| 2016/0200455 A1 | 7/2016 | Gadgil et al. | |
| 2016/0203659 A1 | 7/2016 | Chai et al. | |
| 2016/0219022 A1 | 7/2016 | Peterson | |
| 2016/0257429 A1 | 9/2016 | Szeto | |
| 2016/0314632 A1 | 10/2016 | Lu et al. | |
| 2017/0259942 A1* | 9/2017 | Ziarno | F02C 9/00 |

\* cited by examiner

PROTOCOL FOR COMMUNICATING ENGINE DATA TO WIRELESS COMMUNICATION UNIT

PRIORITY CLAIM

The present application claims the benefit of priority of U.S. Provisional Patent Application No. 62/356,703, entitled "PROTOCOL FOR COMMUNICATING ENGINE DATA TO WIRELESS COMMUNICATION UNIT," filed Jun. 30, 2016, which is incorporated herein by reference for all purposes.

FIELD

The present subject matter relates generally to aviation systems.

BACKGROUND

An aerial vehicle can include one or more engines for propulsion of the aerial vehicle. The one or more engines can include and/or can be in communication with one or more electronic engine controllers (EECs). The one or more EECs can record data related to the one or more engines. If the data resides on the EECs, then it can be difficult for a ground system to use the data. Automated engine data transfer replaces manual data retrieval and increases the availability of data at the ground system.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a wireless communication unit for communicating engine data to a ground system. The wireless communication unit includes one or more memory devices. The wireless communication unit includes one or more processors. The one or more processors are configured to receive a request to store first data in a first memory location in the one or more memory devices. The one or more processors are configured to receive the first data, wherein the first data is associated with identification of an engine, and wherein the first data includes parameterized data. The one or more processors are configured to store the first data in the first memory location. The one or more processors are configured to receive a request to store second data in a second memory location in the one or more memory devices, wherein the second memory location is reserved for data to be transmitted to the ground system. The one or more processors are configured to receive the second data. The second data can be streamed data (e.g., flight/engine data). The one or more processors are configured to store the second data in the second memory location.

Other example aspects of the present disclosure are directed to systems, methods, aircrafts, engines, controllers, devices, non-transitory computer-readable media for recording and communicating engine data. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
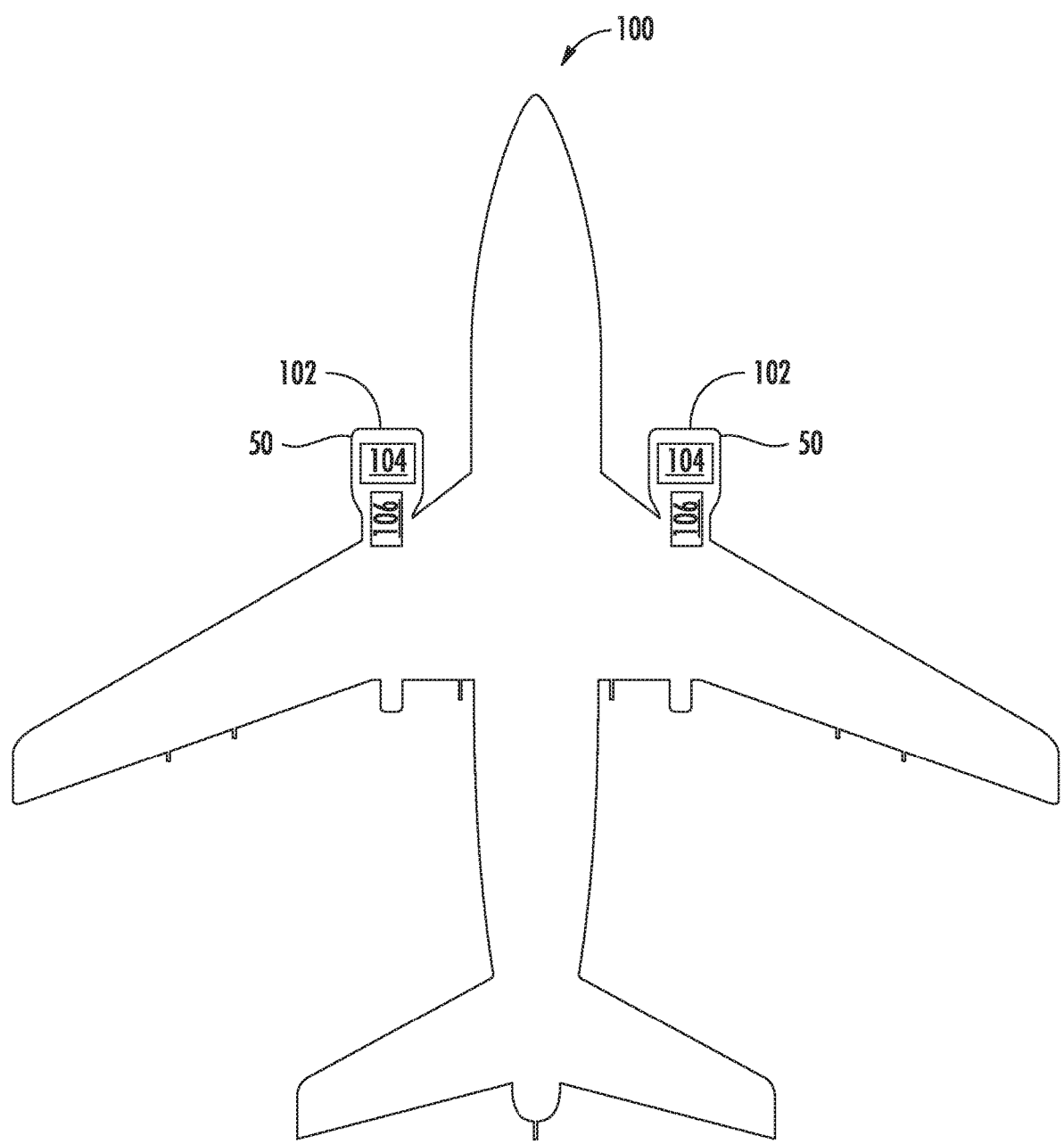
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems for recording and communicating engine data on an aerial vehicle. The aerial vehicle can include one or more engines for operations, such as propulsion of the aerial vehicle. The one or more engines can include and/or be in communication with one or more electronic engine controllers (EECs).

According to example embodiments of the present disclosure, the one or more engines and/or the one or more EECs can include and/or can be in communication with one or more wireless communication units (WCUs). During flight or other operation of the aerial vehicle, the one or more EECs can record data related to the one or more engines and can communicate (e.g., transmit, send, push, etc.) the data to the one or more WCUs, where the WCUs can store the data in a memory. Each EEC can communicate the data to its own associated WCU. In addition and/or in the alternative, each EEC can communicate data to a single WCU located on the aerial vehicle. Upon the occurrence of a particular trigger condition (e.g., flight phase transition), the one or more WCUs can communicate the data to a ground system over a wireless network, such as a cellular network.

In some embodiments, the WCU can be adaptable for communication with the EEC via an interface. The interface can be a Telecommunications Industry Association (TIA)

TIA-485 interface or other interface, such as an Ethernet interface, an Aeronautical Radio INC (ARINC) 664 interface, an RS-232 interface, etc. The WCU can be adaptable for communication with the ground system via an antenna. The WCU can transmit information received from the EEC to the ground system. The ground system can use the information received from the WCU to determine a status (e.g., state, health, etc.) of an engine associated with the WCU. In addition, the WCU can be adaptable for communication with a portable maintenance access terminal (PMAT) for maintenance.

The methods and systems according to example aspects of the present disclosure can include a protocol for communication between the WCU and the EEC via, for instance, the TIA-485 interface. The protocol can include the EEC requesting specific memory locations for storage from the WCU. In response to the request, the WCU can transmit an acknowledgement to the EEC. In response to the acknowledgement, the EEC can transmit data to the WCU. The data can be parameterized data (e.g., identification data). Parameterized data can be processed by the WCU. Parameterized data can be associated with a particular memory location. For example, a first memory location in the WCU can be reserved for parameterized data (e.g., identification data). The data stored in the first memory location can identify a particular engine and/or EEC.

In addition, a second memory location in the WCU can be reserved for transfer data. The data stored in the second memory location can be data for transmitting to a ground system. For instance, the second data can be streamed data. Streamed data can be simply recorded by the WCU at a first time, and then transferred to another computing device, such as a computing device associated with the ground system, at a second time.

One example aspect of the present disclosure is directed to a wireless communication unit for communicating engine data to a ground system. The wireless communication unit includes one or more memory devices. The wireless communication unit includes one or more processors. The one or more processors are configured to receive a request to store first data in a first memory location in the one or more memory devices. The one or more processors are configured to receive the first data. The first data is associated with, for instance, identification of an engine. The first data includes parameterized data. The one or more processors are configured to store the first data in the first memory location. The one or more processors are configured to receive a request to store second data in a second memory location in the one or more memory devices. The one or more processors are configured to receive the second data. The second memory location can be reserved for data to be transmitted to the ground system. The second data can be streamed data (e.g., flight/engine data). The one or more processors are configured to store the second data in the second memory location.

In an embodiment, the one or more processors are further configured to transmit third data to an electronic engine controller. In an embodiment, the first data identifies an electronic engine controller associated with the engine. In an embodiment, the first data includes a safe to transfer indication. In an embodiment, the first data includes a flight mode. In an embodiment, the second data is engine data. In an embodiment, the second data is streamed data. In an embodiment, the first data and the second data are received from an electronic engine controller via a Telecommunications Industry Association TIA-485 interface. In an embodiment, the first request and the second request are implicit as part of a protocol for communicating data to the wireless communication unit. In an embodiment, a first set of bits associated with one or more data packets indicate that the data is parameterized data for storage at the first memory location and a second set of bits associated with one or more another data packets indicate that the data is streamed data for storage in the second memory location.

Another example aspect of the present disclosure is directed to a method for communicating engine data to a ground system. The method includes receiving, at one or more computing devices, a request to store first data in a first memory location in one or more memory devices. The method includes receiving, at the one or more computing devices, the first data. The first data is associated with, for instance, identification of an engine. The first data includes parameterized data. The method includes storing, at the one or more computing devices, the first data in the first memory location. The method includes receiving, at the one or more computing devices, a request to store second data in a second memory location in the one or more memory devices, wherein the second memory location is reserved for data to be transmitted to the ground system. The method includes receiving, at the one or more computing devices, the second data. The second data can be streamed data (e.g., flight/engine data). The method includes storing, at the one or more computing devices, the second data in the second memory location.

In an embodiment, the method further includes transmitting, at the one or more computing devices, third data to an electronic engine controller. In an embodiment, the first data identifies an electronic engine controller associated with the engine. In an embodiment, the first data includes a safe to transfer indication. In an embodiment, the first data includes a flight mode. In an embodiment, the second data is engine data. In an embodiment, the second data is streamed data. In an embodiment, the first data and the second data are received from an electronic engine controller via a Telecommunications Industry Association TIA-485 interface. In an embodiment, the first request and the second request are implicit as part of a protocol for communicating data to the wireless communication unit. In an embodiment, a first set of bits associated with one or more data packets indicate that the data is parameterized data for storage at the first memory location and a second set of bits associated with one or more another data packets indicate that the data is streamed data for storage in the second memory location.

Another example aspect of the present disclosure is directed to a system for communicating engine data to a ground system. The system includes one or more memory devices. The system includes one or more processors. The one or more processors are configured to receive a request to store first data in a first memory location in the one or more memory devices. The one or more processors are configured to receive the first data, wherein the first data is associated with identification of an engine, and wherein the first data comprises parameterized data. The one or more processors are configured to store the first data in the first memory location. The one or more processors are configured to receive a request to store second data in a second memory location in the one or more memory devices, wherein the second memory location is reserved for data to be transmitted to the ground system. The one or more processors are configured to receive the second data. The second data can be streamed data (e.g., flight/engine data). The one or more processors are configured to store the second data in the second memory location.

In an embodiment, the one or more processors are further configured to transmit third data to an electronic engine controller. In an embodiment, the first data identifies an electronic engine controller associated with the engine. In an embodiment, the first data includes a safe to transfer indication. In an embodiment, the first data includes a flight mode. In an embodiment, the second data is engine data. In an embodiment, the second data is streamed data. In an embodiment, the first data and the second data are received from an electronic engine controller via a Telecommunications Industry Association TIA-485 interface. In an embodiment, the first request and the second request are implicit as part of a protocol for communicating data to the wireless communication unit. In an embodiment, a first set of bits associated with one or more data packets indicate that the data is parameterized data for storage at the first memory location and a second set of bits associated with one or more another data packets indicate that the data is streamed data for storage in the second memory location.

Another example aspect of the present disclosure is directed to an aerial vehicle. The aerial vehicle includes one or more memory devices. The aerial vehicle includes one or more processors. The one or more processors are configured to receive a request to store first data in a first memory location in the one or more memory devices. The one or more processors are configured to receive the first data, wherein the first data is associated with identification of an engine, and wherein the first data comprises parameterized data. The one or more processors are configured to store the first data in the first memory location. The one or more processors are configured to receive a request to store second data in a second memory location in the one or more memory devices, wherein the second memory location is reserved for data to be transmitted to a ground system. The one or more processors are configured to receive the second data. The second data can be streamed data (e.g., flight/engine data). The one or more processors are configured to store the second data in the second memory location.

In an embodiment, the one or more processors are further configured to transmit third data to an electronic engine controller. In an embodiment, the first data identifies an electronic engine controller associated with the engine. In an embodiment, the first data includes a safe to transfer indication. In an embodiment, the first data includes a flight mode. In an embodiment, the second data is engine data. In an embodiment, the second data is streamed data. In an embodiment, the first data and the second data are received from an electronic engine controller via a Telecommunications Industry Association TIA-485 interface. In an embodiment, the first request and the second request are implicit as part of a protocol for communicating data to the wireless communication unit. In an embodiment, a first set of bits associated with one or more data packets indicate that the data is parameterized data for storage at the first memory location and a second set of bits associated with one or more another data packets indicate that the data is streamed data for storage in the second memory location.

FIG. 1 depicts a block diagram of an aerial vehicle 100 according to example embodiments of the present disclosure. The aerial vehicle 100 can include one or more engines 102. The one or more engines 102 can cause operations, such as propulsion, of the aerial vehicle 100. An engine 102 can include a nacelle 50 for housing components. An engine 102 can be a gas turbine engine. A gas turbine engine can include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The one or more engines 102 can include and/or be in communication with one or more electronic engine controllers (EECs) 104. The one or more engines 102 and/or the one or more EECs 104 can include and/or be in communication with one or more wireless communication units (WCUs) 106. The one or more EECs 104 can record data related to the one or more engines 102 and communicate (e.g., transmit, send, push, etc.) the data to the one or more WCUs 106. The one or more WCUs 106 can communicate the data to a ground system, via, for instance, an antenna positioned and configured within the nacelle 50. The one or more WCUs 106 can be located within a nacelle 50 housing an engine 102 or another location on the aerial vehicle 100.

Figure 2:
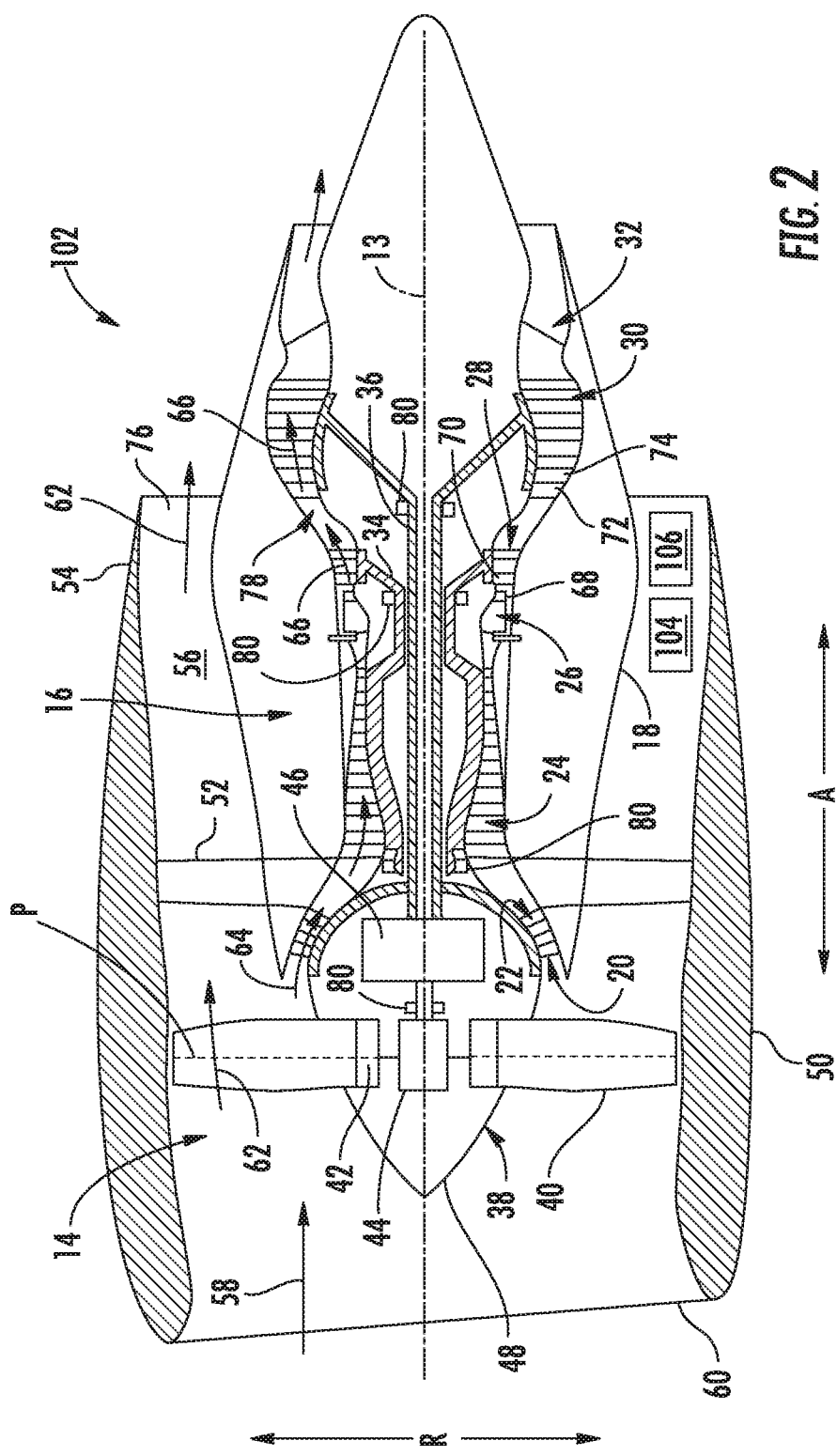
FIG. 2 depicts an engine according to example embodiments of the present disclosure.

FIG. 2 depicts an engine 102 according to example embodiments of the present disclosure. The engine 102 can be one of the one or more engines 102 on the aerial vehicle 100 in FIG. 1. More particularly, for the embodiment of FIG. 2, the engine 102 is configured as a gas turbine engine, or rather as a high-bypass turbofan jet engine 102, referred to herein as "turbofan engine 102." Those of ordinary skill in the art, using the disclosures provided herein, will understand that WCUs can be used in conjunction with other types of propulsion engines without deviating from the scope of the present disclosure, including engines associated with helicopters and other aerial vehicles.

As shown in FIG. 2, the turbofan engine 102 defines an axial direction A (extending parallel to a longitudinal centerline 13 provided for reference), a radial direction R, and a circumferential direction (not shown) extending about the axial direction A. In general, the turbofan includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 102.

In order to support such rotary components, the turbofan engine includes a plurality of air bearings 80 attached to various structural components within the turbofan engine 102. Specifically, for the embodiment depicted the bearings 80 facilitate rotation of, e.g., the LP shaft 36 and HP shaft 34 and dampen vibrational energy imparted to bearings 80 during operation of the turbofan engine 102. Although the bearings 80 are described and illustrated as being located generally at forward and aft ends of the respective LP shaft 36 and HP shaft 34, the bearings 80 may additionally, or alternatively, be located at any desired location along the LP shaft 36 and HP shaft 34 including, but not limited to, central or mid-span regions of the shafts 34, 36, or other locations along shafts 34, 36 where the use of conventional bearings 80 would present significant design challenges. Further, bearings 80 may be used in combination with conventional oil-lubricated bearings. For example, in one embodiment, conventional oil-lubricated bearings may be located at the ends of shafts 34, 36, and one or more bearings 80 may be located along central or mid-span regions of shafts 34, 36.

Referring still to the embodiment of FIG. 2, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 13 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 2, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 102, a volume of air 58 enters the turbofan through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 102 depicted in FIG. 2 is provided by way of example only, and that in other exemplary embodiments, the turbofan engine 102 may have any other suitable configuration. It should also be appreciated, that in still other exemplary embodiments, aspects of the present disclosure may be incorporated into any other suitable gas turbine engine or other propulsion engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a turboshaft, a centrifugal compressor, and/or a turbocharger.

According to example aspects of the present disclosure, the engine 102 can include an electronic engine controller (EEC) 104. The EEC 104 can record operational and performance data for the engine 102. The EEC 104 can be in communication with a wireless communication unit (WCU) 106. The WCU 106 can be mounted on the engine 102. The EEC 104 and the WCU 106 can communicate using wireless and/or wired communications. In some embodiments, the communication with the EEC 104 and the WCU 106 can be one-way communication (e.g., the EEC 104 to the WCU 106). In some embodiments, the communication with the EEC 104 and the WCU 106 can be two-way communication. The WCU 106 can be located on the engine or elsewhere on the aircraft. The nacelle 50 can include an antenna (not shown). In another aspect, the antenna can be integrated with the WCU 106. In another aspect, the antenna can be located elsewhere on the aircraft and used by the WCU and optionally other devices.

Figure 3:
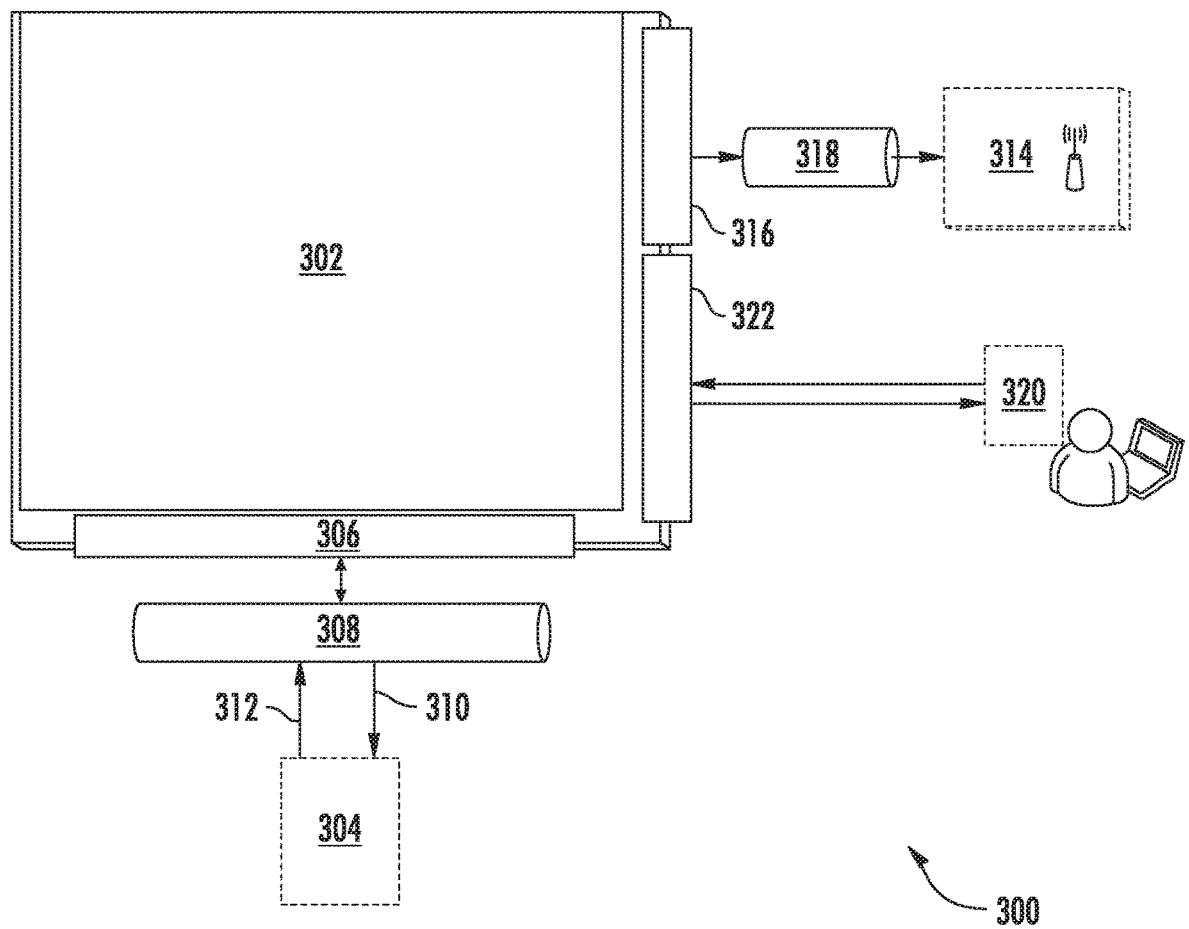
FIG. 3 depicts a wireless communication system according to example embodiments of the present disclosure.

FIG. 3 depicts a wireless communication system (WCS) 300 according to example embodiments of the present disclosure. The system 300 can include a wireless communication unit (WCU) 302. The WCU 302 can be the WCU 106 of FIGS. 1 and 2. The WCU 302 can be in communication with an electronic engine controller (EEC) 304 over a suitable interface 306. The EEC 304 can be the same as the EEC 104 of FIGS. 1 and 2. In some embodiments, the interface 306 can be, for instance, a Telecommunications Industry Association (TIA) TIA-485 interface 306.

In particular implementations, the WCU 302 and the EEC 304 can communicate via a connection 308 with, for instance, the TIA-485 interface 306. The connection 308 can, for example, accommodate other interfaces, such as an Ethernet connection, a wireless connection, or other interface. The WCU 302 can transmit addressing (e.g., memory location, bit size, etc.) information and/or acknowledgements 310 to the EEC 304 via the connection 308. The WCU 302 can receive data 312 from the EEC 304 via the connection 308 and can store the data in one or more memory device. The data 312 can be, for instance, continuous engine operation data, such as thrust level inputs, engine response to thrust level inputs, vibration, flameout, fuel consumption, ignition state, N1 rotation, N2 rotation, N3 rotation, anti-ice capability, fuel filter state, fuel valve state, oil filter state, etc.

The WCU 302 can be configured to communicate the data 312 over a wireless network via an antenna 314 upon the occurrence of one or more trigger conditions, such as trigger conditions based on signals indicative of an aircraft being on the ground or near the ground. In some embodiments, the antenna 314 can be integrated into the WCU 302. In some embodiments, the WCU 302 can include a radio frequency (RF) interface 316. In an embodiment, the antenna 314 can be in communication with the RF interface 316 via an RF cable 318. In an embodiment, the antenna 314 can be placed in the nacelle 50 of an aircraft 102. The nacelle 50 of an aerial vehicle 100 can be made of conductive materials, which can obstruct cellular reception and transmission. In some embodiments, the antenna can be a directional antenna that is oriented near one or more gaps in the nacelle 50 to permit the antenna 314 to communicate directionally outside of the nacelle 50 when the aerial vehicle 100 is landing or upon the occurrence of other trigger conditions.

In some embodiments, the WCU 302 can include an interface for communicating with a portable maintenance access terminal (PMAT) 320. The access terminal can be implemented, for instance, on a laptop, tablet, mobile device, or other suitable computing device. The interface can be, for instance, a Generic Stream Encapsulation (GSE) interface 322 or other suitable interface. The PMAT 320 can be used by a maintenance person to calibrate, troubleshoot, initialize, test, etc. the WCU 302.

The WCU 302 can communicate using wireless communication. The wireless communication can be performed using any suitable wireless technique and/or protocol. For example, the wireless communication can be performed using peer-to-peer communications, network communications, cellular-based communications, satellite-based communications, etc. As another example, the wireless communications can be performed using Wi-Fi, Bluetooth, ZigBee, etc.

Figure 4:
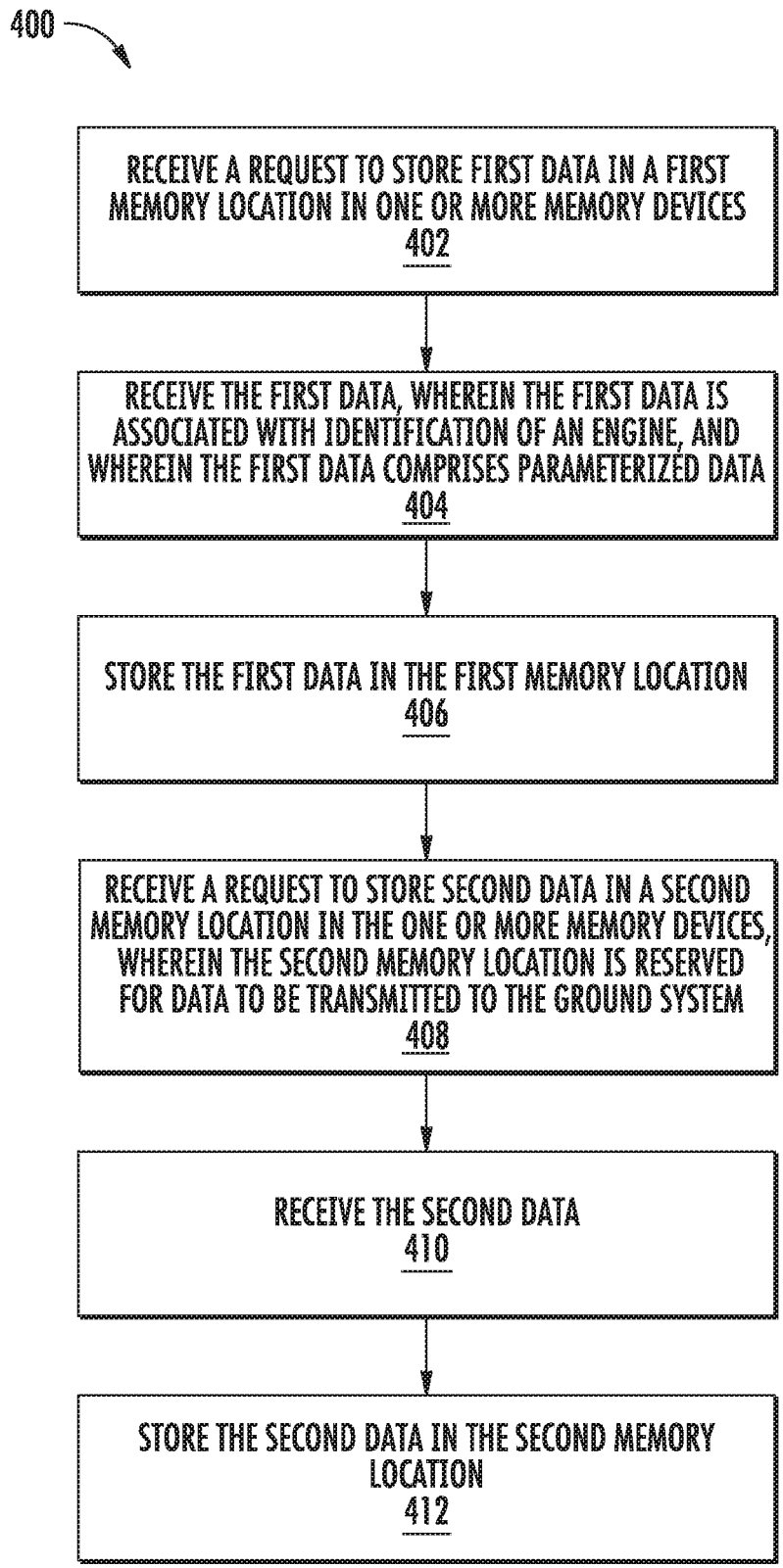
FIG. 4 depicts a flow diagram of an example method according to example embodiments of the present disclosure.

FIG. 4 depicts a flow diagram of an example method (400) for communicating engine data to a ground system. The method of FIG. 4 can be implemented using, for instance, the WCU 302 of FIG. 3. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), a request to store first data in a first memory location in one or more memory devices can be received. For instance, the WCU 302 can receive a request to store first data in a first memory location in one or more memory devices from the EEC 304. At (404), the first data can be received. For instance, the WCU 302 can receive the first data from the EEC 304. The first data can include parameterized data. The first data can be associated with identification of an engine. For instance, in some embodiments, the first data can identify an engine. In some embodiments, the first data can comprise an engine serial number. In some embodiments, the first data can identify an EEC. In some embodiments, the first data can comprise an EEC serial number. In some embodiments, the first data can identify a component associated with an engine. In some embodiments, the first data can comprise a serial number of a component associated with an engine. In some embodiments, the first data byte can include instructions. In some embodiments, the first data can be a safe to transfer indication. In some embodiments, the first data can include a flight mode.

At (406), the first data can be stored in the first memory location. For instance, the WCU 302 can store the first data in the first memory location. The first memory location can be known to be reserved for parameterized data. At (408), a request to store second data in a second memory location in the one or more memory devices can be received. For instance, the WCU 302 can receive a request to store second data in a second memory location in the one or more memory devices from the EEC 304. The second memory location can be reserved for data to be transmitted to the ground system. In some embodiments, the second data can be engine data. In some embodiments, the second data can be streamed data. The second memory location can be associated with streamed data, such as engine diagnosis data. In some embodiments, the second data can be engine diagnosis data associated with the engine and/or component identified by the first data.

At (410), the second data can be received. For instance, the WCU 302 can receive the second data from the EEC 304. In an aspect, the first data and the second data are received at the WCU 302 from the EEC 304 via the TIA-485 interface 306. At (412), the second data can be stored in the second memory location. For instance, the WCU 302 can store second data in the second memory location. The second memory location can be known to be reserved for streamed data.

Optionally, the WCU can communicate a third data to the EEC, such as a WCU status set of bits. In some embodiments, the first request and the second request can be implicit as part of a protocol for communicating data to the WCU. For instance, a first set of bits associated with a data packet can indicate that the data is parameterized data for storage at a first memory location. A second or different set of bits associated with a data packet can indicate that the data is streamed data for storage in a second memory location.

Figure 5:
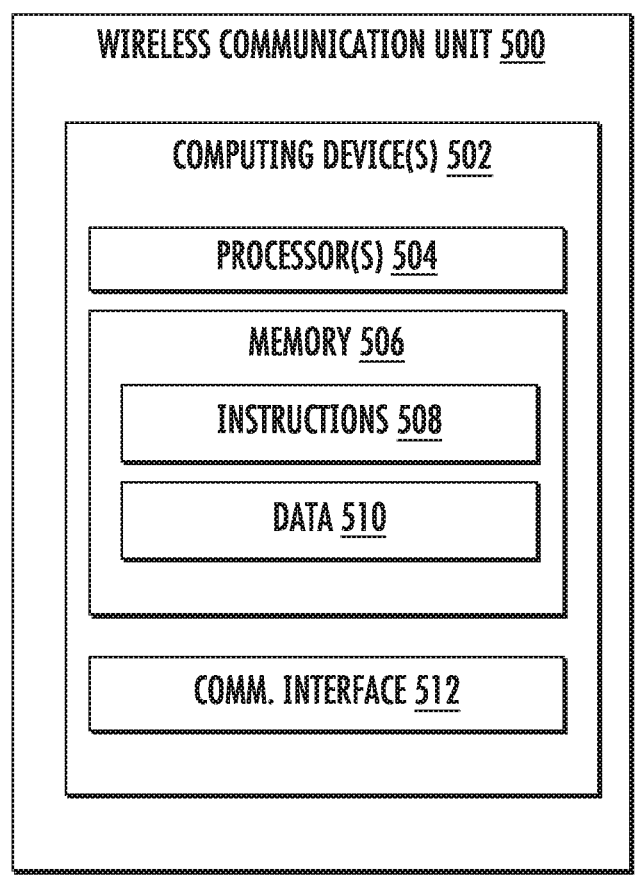
FIG. 5 depicts a computing system for implementing one or more aspects according to example embodiments of the present disclosure.

FIG. 5 depicts a block diagram of an example computing system that can be used to implement a wireless communication unit (WCU) 500, such as WCU 302, or other systems according to example embodiments of the present disclosure. As shown, the WCU 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s)

504 to perform operations, such as the operations for recording and communicating engine data, as described with reference to FIG. 4, and/or any other operations or functions of the one or more computing device(s) 502.

The memory device(s) 506 can further store data 510 that can be accessed by the processors 504. For example, the data 510 can include diagnostic data, data associated with engine performance, engine operation, engine failure, errors in engine performance, errors in engine operation, errors in engine behavior, expected engine behavior, actual engine behavior, etc., as described herein. The data 510 can include one or more table(s), function(s), algorithm(s), model(s), equation(s), etc. according to example embodiments of the present disclosure.

The one or more computing device(s) 502 can also include a communication interface 512 used to communicate, for example, with the other components of system. For example, the communication interface 512 can accommodate communications with the EEC 304, the antenna 314, the PMAT 320, a ground control system, other WCUs 302, a central computing device, any other device, and/or any combination of the foregoing. The communication interface 512 can include any suitable components for interfacing with one or more network(s), including for example, transmitters, receivers, transceivers, ports, controllers, antennas, or other suitable components.

Although specific features of various embodiments may be shown in some drawings and not in others, this is for convenience only. In accordance with the principles of the present disclosure, any feature of a drawing may be referenced and/or claimed in combination with any feature of any other drawing. Example aspects of the present disclosure are discussed with referenced to aerial vehicles. Those of ordinary skill in the art, using the disclosures provided herein, will understand that example aspects of the present disclosure can be used with other vehicles having engines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wireless communication unit for communicating engine data to a ground system, the wireless communication unit comprising:
   one or more memory devices; and
   one or more processors configured to:
     receive a request from an engine controller to store first data in a first memory location in the one or more memory devices;
     receive the first data, wherein the first data is associated with identification of an engine, and wherein the first data comprises parameterized data;
     store the first data in the first memory location;
     receive a request from the engine controller to store second data in a second memory location in the one or more memory devices, wherein the second memory location is reserved for data to be transmitted to the ground system;
     receive the second data; and
     store the second data in the second memory location.

2. The wireless communication unit of claim 1, wherein the one or more processors are further configured to transmit third data to an electronic engine controller.

3. The wireless communication unit of claim 1, wherein the first data identifies an electronic engine controller associated with the engine.

4. The wireless communication unit of claim 1, wherein the first data comprises a safe to transfer indication.

5. The wireless communication unit of claim 1, wherein the first data comprises a flight mode.

6. The wireless communication unit of claim 1, wherein the second data is engine data.

7. The wireless communication unit of claim 1, wherein the second data is streamed data.

8. The wireless communication unit of claim 1, wherein the one or more processors are configured to:
   in response to the request to store the first data in the first memory location in the one or more memory devices, transmit an acknowledgement to the engine controller, and
   wherein in response to the acknowledgement, the one or more processors receive the first data.

9. The wireless communication unit of claim 1, wherein the first request and the second request are implicit as part of a protocol for communicating data to the wireless communication unit.

10. The wireless communication unit of claim 1, wherein a first set of bits associated with one or more data packets indicate that the data is parameterized data for storage at the first memory location and a second set of bits associated with one or more another data packets indicate that the data is streamed data for storage in the second memory location.

11. A method for communicating engine data to a ground system, the method comprising:
   receiving, at one or more computing devices, a request from an engine controller to store first data in a first memory location in one or more memory devices;
   receiving, at the one or more computing devices, the first data, wherein the first data is associated with identification of an engine, and wherein the first data comprises parameterized data;
   storing, at the one or more computing devices, the first data in the first memory location;
   receiving, at the one or more computing devices, a request from the engine controller to store second data in a second memory location in the one or more memory devices, wherein the second memory location is reserved for data to be transmitted to the ground system;
   receiving, at the one or more computing devices, the second data; and
   storing, at the one or more computing devices, the second data in the second memory location.

12. The method of claim 11, further comprising transmitting, by the one or more computing devices, third data to the engine controller.

13. The method of claim 11, wherein the first data identifies the engine controller associated with the engine.

14. The method of claim 11, wherein the first data comprises a safe to transfer indication.

15. The method of claim 11, wherein the first data comprises a flight mode.

16. The method of claim 11, wherein the second data is engine data.

17. The method of claim 11, wherein the second data is streamed data.

18. The method of claim 11, wherein the first data and the second data are received from the engine controller via a Telecommunications Industry Association TIA-485 interface.

19. The method of claim 11, wherein the first request and the second request are implicit as part of a protocol for communicating data to a wireless communication unit.

20. A system for communicating engine data to a ground system, the system comprising:
  one or more memory devices; and
  one or more processors configured to:
    receive a request from an engine controller to store first data in a first memory location in the one or more memory devices;
    receive the first data, wherein the first data is associated with identification of an engine, and wherein the first data comprises parameterized data;
    store the first data in the first memory location;
    receive a request from the engine controller to store second data in a second memory location in the one or more memory devices, wherein the second memory location is reserved for data to be transmitted to the ground system;
    receive the second data; and
    store the second data in the second memory location.

* * * * *